(12) United States Patent
Shi et al.

(10) Patent No.: US 12,034,956 B2
(45) Date of Patent: Jul. 9, 2024

(54) VIDEO PROCESSING METHOD AND VIDEO PROCESSING APPARATUS

(71) Applicant: BOE TECHNOLOGY GROUP CO., LTD., Beijing (CN)

(72) Inventors: Baoyu Shi, Beijing (CN); Xiaoqin Guo, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 260 days.

(21) Appl. No.: 17/614,725

(22) PCT Filed: Nov. 30, 2020

(86) PCT No.: PCT/CN2020/132721
§ 371 (c)(1),
(2) Date: Nov. 29, 2021

(87) PCT Pub. No.: WO2022/110129
PCT Pub. Date: Jun. 2, 2022

(65) Prior Publication Data
US 2023/0262250 A1    Aug. 17, 2023

(51) Int. Cl.
*H04N 19/463*  (2014.01)
*H04N 19/119*  (2014.01)
*H04N 19/132*  (2014.01)
*H04N 19/136*  (2014.01)
*H04N 19/172*  (2014.01)
(Continued)

(52) U.S. Cl.
CPC ......... *H04N 19/463* (2014.11); *H04N 19/119* (2014.11); *H04N 19/132* (2014.11); *H04N 19/136* (2014.11); *H04N 19/172* (2014.11); *H04N 19/423* (2014.11); *H04N 19/436* (2014.11)

(58) Field of Classification Search
None
See application file for complete search history.

(56) References Cited

U.S. PATENT DOCUMENTS

| 2014/0115597 A1 | 4/2014 | Schmit et al. |
| 2017/0238000 A1* | 8/2017 | Ryu ............ H04N 19/119 |
| | | 375/240.02 |

(Continued)

FOREIGN PATENT DOCUMENTS

| CN | 103118247 | 5/2013 |
| CN | 106791648 | 5/2017 |
| CN | 109218722 | 1/2019 |

OTHER PUBLICATIONS

Ghosh et al., "Scalable Resource Allocation for Multi-Processor QoS Optimization", 23rd International Conference on Distributed Computing Systems, 2003. Proceedings., Providence, RI, USA, 2003, pp. 174-183, doi: 10.1109/ICDCS.2003.1203464.*

(Continued)

*Primary Examiner* — Edemio Navas, Jr.
(74) *Attorney, Agent, or Firm* — Dority & Manning, P.A.

(57) ABSTRACT

A video processing method is provided. The video processing method includes: obtaining a sequence of video frames; obtaining an allocation parameter of the sequence of video frames, and allocating the sequence of video frames to at least one video processor according to the allocation parameter; and processing the allocated sequence of video frames by using the at least one video processor.

16 Claims, 10 Drawing Sheets

(51) Int. Cl.
*H04N 19/423* (2014.01)
*H04N 19/436* (2014.01)

(56) References Cited

U.S. PATENT DOCUMENTS

| | | |
|---|---|---|
| 2018/0089000 A1 | 3/2018 | Ryu |
| 2019/0364084 A1* | 11/2019 | Huang .................... H04L 65/70 |
| 2020/0036766 A1* | 1/2020 | Mahvash ......... H04N 21/23439 |
| 2020/0154080 A1 | 5/2020 | Miller et al. |
| 2021/0044805 A1 | 2/2021 | Liu |
| 2021/0193076 A1* | 6/2021 | Morrell .................. G09G 5/005 |

OTHER PUBLICATIONS

PCT International Search Report and Written Opinion for corresponding PCT Application No. PCT/CN2020/132721, 11 pages.
Extended European Search Report received in corresponding EP Application No. 20963017.7, dated Jul. 27, 2023, 6 pages.

* cited by examiner

VIDEO PROCESSING METHOD AND VIDEO PROCESSING APPARATUS

CROSS-REFERENCE TO RELATED APPLICATION

This application is a national phase entry under 35 USC 371 of International Patent Application No. PCT/CN2020/132721 filed on Nov. 30, 2020, which is incorporated herein by reference in its entirety.

TECHNICAL FIELD

The present disclosure relates to the field of video technologies, and in particular, to a video processing method and an apparatus, an electronic device, and a storage medium.

BACKGROUND

Video is a continuous sequence of images, which consists of consecutive frames, and a frame is an image. Due to persistence of vision effects of human eyes, when a sequence of frames is played at a certain rate, we see a video with continuous motion. Due to an extremely high similarity between consecutive frames, in order to facilitate storage and transmission, an original video is required to be encoded and compressed to remove redundancy in spatial and temporal dimensions.

SUMMARY

In an aspect, a video processing method is provided. The video processing method includes: obtaining a sequence of video frames; obtaining an allocation parameter of the sequence of video frames, and allocating the sequence of video frames to at least one video processor according to the allocation parameter; and processing the allocated sequence of video frames by using the at least one video processor.

In some embodiments, obtaining the allocation parameter of the sequence of video frames, and allocating the sequence of video frames to the at least one video processor according to the allocation parameter, includes: determining at least one video parameter of the sequence of video frames according to the sequence of video frames, the at least one video parameter including at least one of a resolution, a sampling rate, a frame rate, and an encoding rate; comparing the at least one video parameter with at least one video parameter threshold value to obtain a comparison result; and allocating the sequence of video frames to the at least one video processor according to the comparison result.

In some embodiments, comparing the at least one video parameter with the at least one video parameter threshold value to obtain the comparison result, and allocating the sequence of video frames to the at least one video processor according to the comparison result, includes: determining that the at least one video parameter includes the resolution of the sequence of video frames, and determining that the at least one video parameter threshold value includes a first resolution and a second resolution, the first resolution being less than the second resolution; comparing the resolution of the sequence of video frames with the first resolution and the second resolution to obtain a first sub-result; if the first sub-result is that the resolution of the sequence of video frames is less than or equal to the first resolution, allocating the sequence of video frames to a first video processor group; and if the first sub-result is that the resolution of the sequence of video frames is greater than the first resolution and less than the second resolution, allocating the sequence of video frames to a second video processor group; wherein a number of video processors in the second video processor group is greater than a number of at least one video processor in the first video processor group.

In some embodiments, comparing the at least one video parameter with the at least one video parameter threshold value to obtain the comparison result, and allocating the sequence of video frames to the at least one video processor according to the comparison result, further includes: if the first sub-result is that the resolution of the sequence of video frames is greater than or equal to the second resolution, determining that the at least one video parameter further includes the sampling rate of the sequence of video frames, and determining that the at least one video parameter threshold value further includes a first sampling rate and a second sampling rate, the first sampling rate being greater than the second sampling rate; comparing the sampling rate of the sequence of video frames with the first sampling rate and the second sampling rate to obtain a second sub-result; and if the second sub-result is that the sampling rate of the sequence of video frames is equal to the first sampling rate, allocating the sequence of video frames to a third video processor group; wherein a number of video processors in the third video processor group is greater than the number of video processors in the second video processor group.

In some embodiments, comparing the at least one video parameter with the at least one video parameter threshold value to obtain the comparison result, and allocating the sequence of video frames to the at least one video processor according to the comparison result, further includes: if the second sub-result is that the sampling rate of the sequence of video frames is equal to the second sampling rate, determining that the at least one video parameter further includes the frame rate of the sequence of video frames, and determining that the at least one video parameter threshold value further includes a first frame rate and a second frame rate, the first frame rate being less than the second frame rate; comparing the frame rate of the sequence of video frames with the first frame rate and the second frame rate to obtain a third sub-result; if the third sub-result is that the frame rate of the sequence of video frames is less than or equal to the first frame rate, allocating the sequence of video frames to the first video processor group; and if the third sub-result is that the frame rate of the sequence of video frames is greater than the first frame rate, allocating the sequence of video frames to the second video processor group or the third video processor group.

In some embodiments, comparing the at least one video parameter with the at least one video parameter threshold value to obtain the comparison result, and allocating the sequence of video frames to the at least one video processor according to the comparison result, further includes: if the third sub-result is that the frame rate of the sequence of video frames is greater than or equal to the second frame rate, allocating the sequence of video frames to the third video processor group.

In some embodiments, comparing the at least one video parameter with the at least one video parameter threshold value to obtain the comparison result, and allocating the sequence of video frames to the at least one video processor according to the comparison result, further includes: if the third sub-result is that the frame rate of the sequence of video frames is greater than the first frame rate and less than the second frame rate, determining that the at least one video parameter further includes the encoding rate of the sequence of video frames, and determining that the at least one video parameter threshold value further includes a preset encoding rate; comparing the encoding rate of the sequence of video frames with the preset encoding rate to obtain a fourth sub-result; if the fourth sub-result is that the encoding rate of the sequence of video frames is less than the preset encoding rate, allocating the sequence of video frames to the second video processor group; and if the fourth sub-result is that the encoding rate of the sequence of video frames is greater than or equal to the preset encoding rate, allocating the sequence of video frames to the third video processor group.

In some embodiments, obtaining the allocation parameter of the sequence of video frames, and allocating the sequence of video frames to the at least one video processor according to the allocation parameter, further includes: dividing the sequence of video frames into a first sub-sequence to an Nth sub-sequence in a playing sequence, wherein N is greater than or equal to 2; dividing the first sub-sequence to the Nth sub-sequence into at least one portion to be encoded, wherein a number of the at least one portion to be encoded is same as a number of determined at least one video processor, and a portion to be encoded includes at least one sub-sequence; and allocating each portion to be encoded and encoding information corresponding to the portion to be encoded to one video processor.

In some embodiments, the video processing method further includes: detecting that whether a first buffer region to an Nth buffer region corresponding to the first sub-sequence to the Nth sub-sequence receive N encoded data encoded and generated by all of the at least one video processor in one-to-one correspondence; and if the first buffer region to the Nth buffer region receive the N encoded data in one-to-one correspondence, encapsulating and sending the N encoded data in the first buffer region to the Nth buffer region.

In some embodiments, the video processing method further includes: if a part of the first buffer region to the Nth buffer region do not receive or do not completely receive corresponding encoded data, judging that whether a duration between a current moment and a moment when the first buffer region to the Nth buffer region start to receive a first encoded data exceeds a reception duration threshold value; if the duration does not exceed the reception duration threshold value, the part of buffer regions continuing to be in a reception state; and if the duration exceeds the reception duration threshold value, encapsulating and sending encoded data in other buffer regions besides the part of buffer regions in the first buffer region to the Nth buffer region.

In some embodiments, obtaining the allocation parameter of the sequence of video frames, and allocating the sequence of video frames to the at least one video processor according to the allocation parameter, includes: obtaining state parameters of the at least one video processor; and allocating the sequence of video frames to the at least one video processor according to the state parameters of the at least one video processor.

In some embodiments, allocating the sequence of video frames to the at least one video processor according to the state parameters of the at least one video processor, includes: determining encoding speeds of at least two video processors according to the state parameters of the at least one video processor; dividing the sequence of video frames into at least two portions to be encoded in one-to-one correspondence with the at least two video processors in a playing sequence according to the encoding speeds of the at least two video processors, wherein a length of a portion to be encoded is positively related to an encoding speed of a video processor, and the portion to be encoded includes at least one sub-sequence; and allocating each portion to be encoded and encoding information corresponding to the portion to be encoded to one video processor corresponding to the portion to be encoded.

In some embodiments, processing the allocated sequence of video frames by using the at least one video processor, includes: encoding, by each video processor, all sub-sequences in the portion to be encoded sequentially according to the encoding information.

In another aspect, a video processing apparatus is provided. The video processing apparatus includes a central processing unit and at least two video processors. The central processing unit is configured to execute following operations: obtaining a sequence of video frames; obtaining an allocation parameter of the sequence of video frames, and allocating the sequence of video frames to at least one video processor according to the allocation parameter; and processing the allocated sequence of video frames by using the at least one video processor.

In some embodiments, the central processing unit is configured to: divide the sequence of video frames into a first sub-sequence to an Nth sub-sequence in a playing sequence, wherein N is greater than or equal to 2; divide the first sub-sequence to the Nth sub-sequence into at least one portion to be encoded, wherein a number of the at least one portion to be encoded is same as a number of determined at least one video processor, and a portion to be encoded includes at least one sub-sequence; and allocate each portion to be encoded and encoding information corresponding to the portion to be encoded to one video processor.

In some embodiments, the video processing apparatus includes a memory synchronously connected to all of the at least one video processor, and the memory includes a first buffer region to an Nth buffer region, where N is greater than or equal to 2. Each video processor is configured to: sequentially encode all sub-sequences in the portion to be encoded according to the encoding information, so as to generate at least one encoded data, each encoded data corresponding to one sub-sequence in the portion to be encoded; and send the encoded data to a same numbered buffer region according to a number of a corresponding sub-sequence.

In yet another aspect, an electronic device is provided. The electronic device includes the video processing apparatus according to any one of the above embodiments.

In some embodiments, the electronic device is a display device.

In yet another aspect, a non-transitory computer-readable storage medium is provided, which stores computer program instructions. When the computer program instructions run on a processor, the processor executes the video processing method according to any one of the above embodiments.

In yet another aspect, a computer program product is provided. The computer program product includes computer program instructions that are stored in a non-transitory computer-readable storage medium. When executed on a computer, the computer program instructions enable the computer to execute the video processing method according to any one of the above embodiments.

In yet another aspect, a computer program is provided. When executed on a computer, the computer program enables the computer to execute the video processing method according to any one of the above embodiments.

BRIEF DESCRIPTION OF THE DRAWINGS

In order to describe technical solutions in the present disclosure more clearly, the accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, but are not limitations on an actual size of a product, an actual process of a method, and an actual timing of a signal involved in the embodiments of the present disclosure.

DETAILED DESCRIPTION

Figure 1:
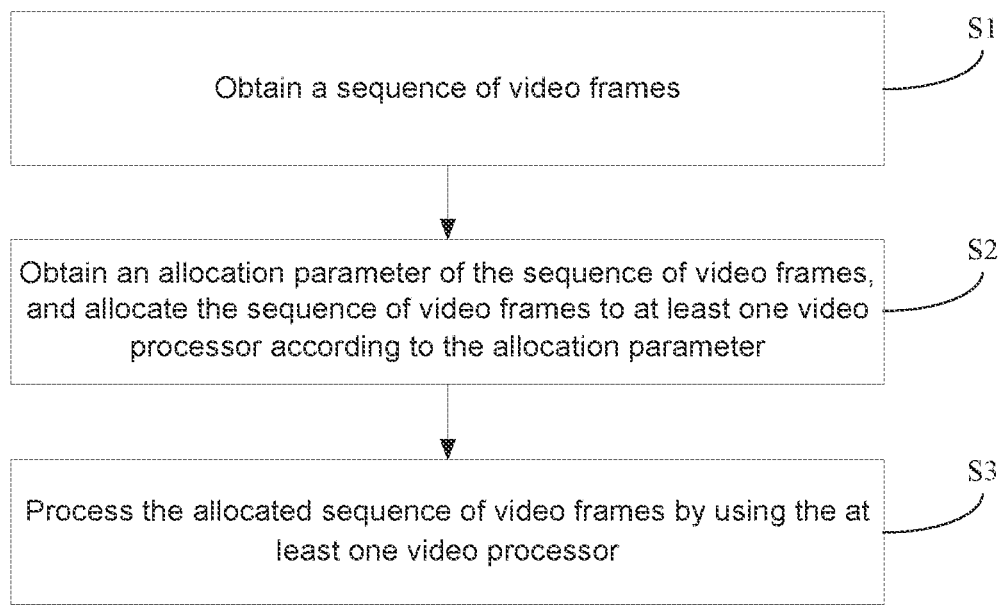
FIG. 1 is a flow diagram of a video processing method, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art on a basis of the embodiments of the present disclosure shall be included in the protection scope of the present disclosure.

Unless the context requires otherwise, throughout the description and the claims, the term "comprise" and other forms thereof such as the third-person singular form "comprises" and the present portioniciple form "comprising" are construed as an open and inclusive meaning, i.e., "including, but not limited to". In the description of the specification, the terms such as "one embodiment", "some embodiments", "exemplary embodiments", "an example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms such as "first" and "second" are only used for descriptive purposes, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, "a plurality of/the plurality of" means two or more unless otherwise specified.

In the description of some embodiments, the terms such as "coupled", "connected" and their derivatives may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact with each other. However, the term "coupled" or "communicatively coupled" may also mean that two or more components are not in direct contact with each other, but still cooperate or interact with each other. The embodiments disclosed herein are not necessarily limited to the contents herein.

The phrase "at least one of A, B and C" has a same meaning as the phrase "at least one of A, B or C", both including the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if" is optionally construed as "when" or "in a case where" or "in response to determining" or "in response to detecting", depending on the context. Similarly, the phrase "if it is determined that" or "if [a stated condition or event] is detected" is optionally construed as "in a case where it is determined that" or "in response to determining that" or "in a case where [the stated condition or event] is detected" or "in response to detecting [the stated condition or event]", depending on the context.

The use of the phrase "applicable to" or "configured to" herein means an open and inclusive language, which does not exclude devices that are applicable to or configured to perform additional tasks or steps.

In addition, the use of the phrase "based on" means openness and inclusiveness, in that a process, step, calculation or other action "based on" one or more of the stated conditions or values may, in practice, be based on additional conditions or values exceeding those stated.

The term such as "about" or "approximately" as used herein includes a stated value and an average value within an acceptable range of deviation of a particular value determined by a person of ordinary skill in the art, considering measurement in question and errors associated with measurement of a particular quantity (i.e., limitations of a measurement system).

The quality of a video is different in different application scenarios, and thus an original sequence of video frames has diversified formats. That is, a resolution, frame rate, encoding rate, sampling rate of the original sequence of video frames are uncertain. Based on this, if a same encoding resource is used to encode the original sequence of video frames of different formats, a problem of wasting encoding resources or slow encoding speed is likely to occur.

Based on this, some embodiments of the present disclosure provide a video processing method. As shown in FIG. 1, the video processing method includes S1 to S3.

In S1, a sequence of video frames is obtained.

The sequence of video frames includes a plurality of images, and each image is a frame. Due to the persistence of vision effects of human eyes, when the plurality of images are played sequentially at a certain rate, human eyes may see a video with continuous motion.

The sequence of video frames may be a sequence of YUV video frames. YUV is divided into three components. "Y" represents a luminance (or referred to as luma), which is a gray value. "U" and "V" represent a chrominance (or referred to as chroma), which functions to describe a color and a saturation of an image for specifying a color of a pixel.

In S2, an allocation parameter of the sequence of video frames is obtained, and the sequence of video frames is allocated to at least one video processor according to the allocation parameter.

In S3, the allocated sequence of video frames is processed by using the at least one video processor.

Through the above S1 to S3, for example, the sequence of video frames may be divided into a plurality of groups according to the allocation parameter, and then the groups are respectively allocated to a plurality of video processors for parallel processing, thereby helping to increase a processing speed of the sequence of video frames.

Figure 2:
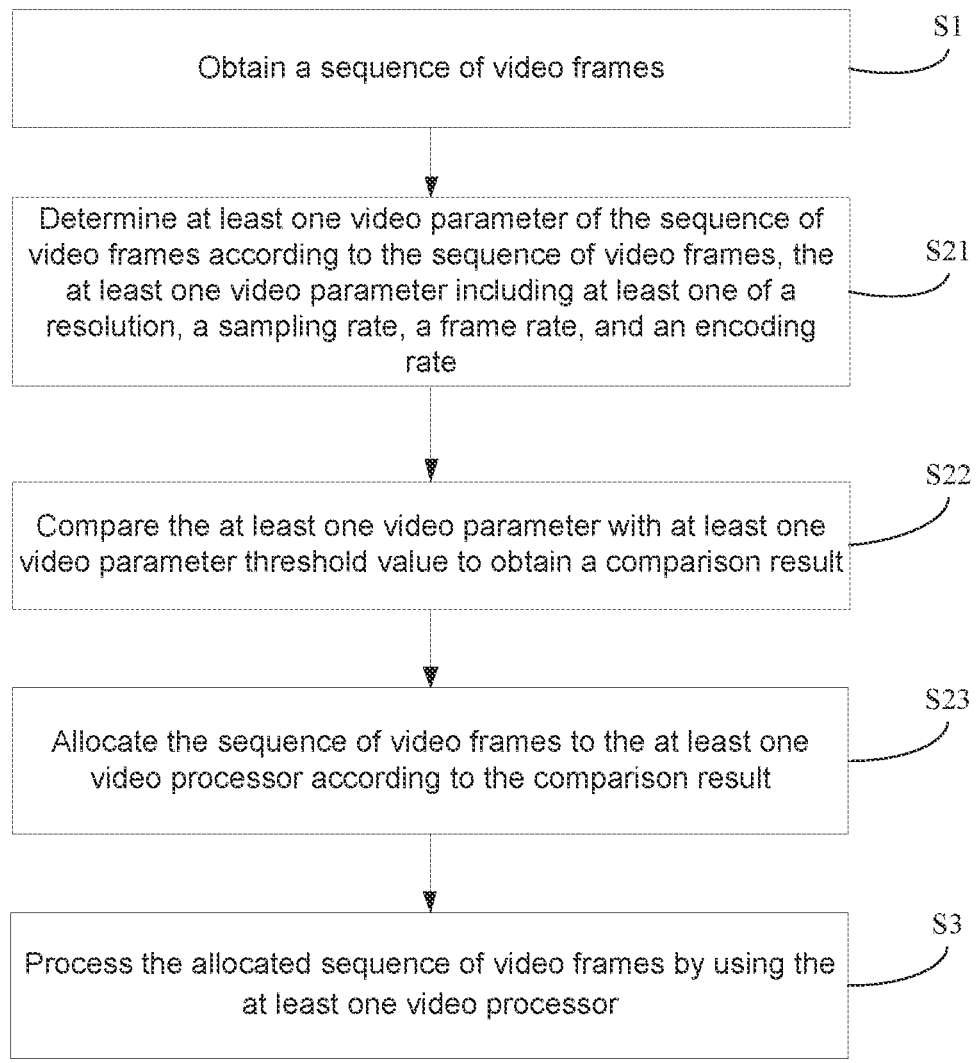
FIG. 2 is a flow diagram of another video processing method, in accordance with some embodiments.

In some examples, as shown in FIG. 2, in S2, obtaining the allocation parameter of the sequence of video frames, and allocating the sequence of video frames to the at least one video processor according to the allocation parameter, includes S21 to S23.

In S21, at least one video parameter of the sequence of video frames is determined according to the sequence of video frames. The at least one video parameter includes at least one of a resolution, a sampling rate, a frame rate, and an encoding rate.

The resolution determines a fineness of an image. Generally, the higher the resolution is, the more pixels are included in the image, and the clearer the image is.

The sampling rate determines a color quality of an image. For example, in the sequence of YUV video frames, a sampling rate of 4:2:2 indicates that every two Y shares a set of UV components, and a sampling rate of 4:4:4 indicates that each Y corresponds to a set of UV components. Obviously, the color quality of the image is higher for the sampling rate of 4:4:4.

The frame rate refers to a frequency at which a frame image in the sequence of video frames appears continuously.

The encoding rate refers to an amount of data transmitted per unit time during data transmission.

In S22, the at least one video parameter is compared with at least one video parameter threshold value to obtain a comparison result.

For example, the resolution may be compared with a preset resolution to obtain a relative magnitude between the resolution and the preset resolution. The sampling rate may also be compared with a preset sampling rate to obtain a relative magnitude between the sampling rate and the preset sampling rate. The frame rate may also be compared with a preset frame rate to obtain a relative magnitude between the frame rate and the preset frame rate. Or, the encoding rate may also be compared with a preset encoding rate to obtain a relative magnitude between the encoding rate and the preset encoding rate.

It will be noted that the resolution, sampling rate, frame rate, and encoding rate are just some examples of video parameters. That is, in some other examples, the video parameter may also be other parameter besides the resolution, sampling rate, frame rate, and encoding rate. For example, the other parameter may be a parameter that is able to reflect an amount of data of the sequence of video frames.

In S23, the sequence of video frames is allocated to the at least one video processor according to the comparison result. The video processor may be, for example, a graphics processing unit (GPU).

For example, the sequence of video frames may be allocated to the at least one video processor according to one or more of a comparison result between the resolution and the preset resolution, a comparison result between the sampling rate and the preset sampling rate, a comparison result between the frame rate and the preset frame rate, and a comparison result between the encoding rate and the preset encoding rate.

It will be noted that the amount of data of the sequence of video frames may be determined through one or more of the comparison result between the resolution and the preset resolution, the comparison result between the sampling rate and the preset sampling rate, the comparison result between the frame rate and the preset frame rate, and the comparison result between the encoding rate and the preset encoding rate. The larger the amount of data of the sequence of video frames, the higher the encoding complexity, and the higher the consumed encoding resources. In this case, the sequence of video frames is allocated to more video processors, which helps to increase the encoding speed. In a case where the amount of data of the sequence of video frames is small, the sequence of video frames may be allocated to fewer video processors to reduce consumption of hardware resources, thereby achieving a purpose of reasonably utilizing video processor resources.

There are many possible manners for implementing S22 (comparing the at least one video parameter with the at least one video parameter threshold value to obtain the comparison result) and S23 (allocating the sequence of video frames to the at least one video processor according to the comparison result), for example, including but not limited to some embodiments below.

Figure 3:
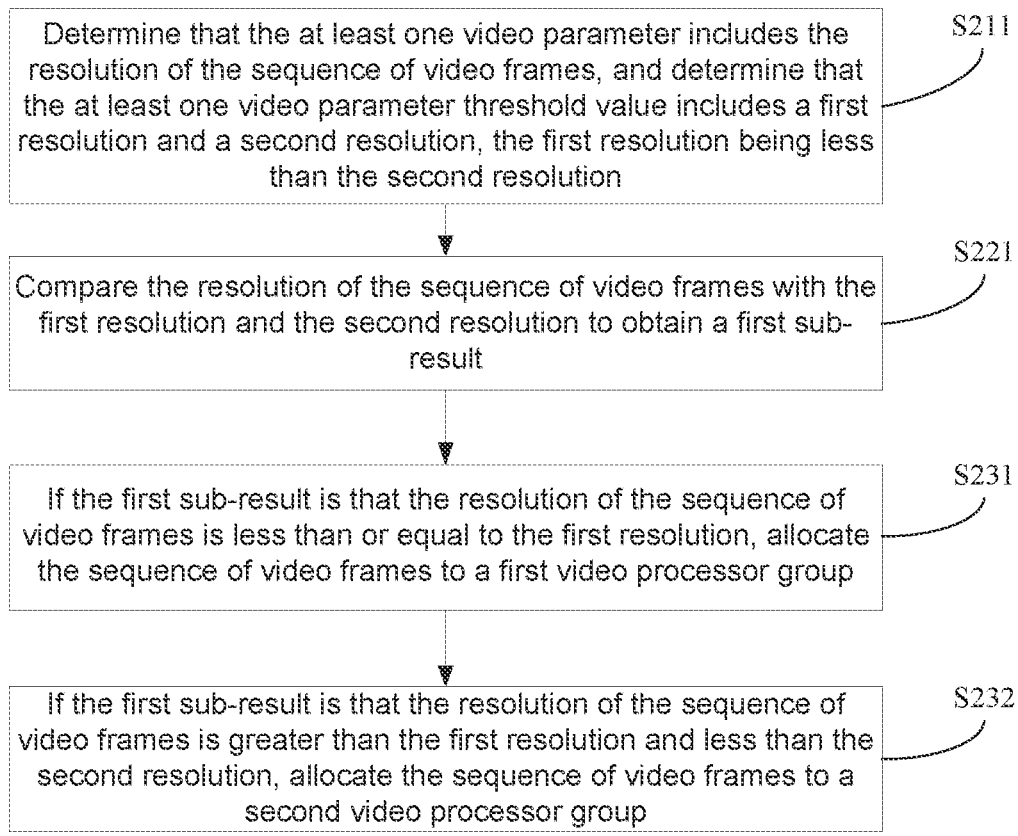
FIG. 3 is a flow diagram of yet another video processing method, in accordance with some embodiments.

In some embodiments, as shown in FIG. 3, S22 includes S211 and S221, and S23 includes S231 and S232.

In S211, it is determined that the at least one video parameter includes the resolution of the sequence of video frames, and it is determined that the at least one video parameter threshold value includes a first resolution and a second resolution. The first resolution is less than the second resolution.

It can be understood that the higher the resolution, the finer the display, and moreover, the larger the amount of data of the sequence of video frames.

In S221, the resolution of the sequence of video frames is compared with the first resolution and the second resolution to obtain a first sub-result.

In S231, if the first sub-result is that the resolution of the sequence of video frames is less than or equal to the first resolution, the sequence of video frames is allocated to a first video processor group.

In S232, if the first sub-result is that the resolution of the sequence of video frames is greater than the first resolution and less than the second resolution, the sequence of video frames is allocated to a second video processor group.

The number of video processors in the second video processor group is greater than the number of video processor(s) in the first video processor group. For example, the first video processor group may include any one of all of the video processor(s), and the second video processor group may include any two of all of the video processors. For another example, the first video processor group may include any two of all of the video processors, and the second video processor group may include any four of all of the video processors. Therefore, the number of video processors in the second video processor group and the number of video processor(s) in the first video processor group are not limited in the embodiments of the present disclosure, as long as the two numbers satisfy the magnitude relationship.

In addition, it will be noted that the first video processor group and the second video processor group may or may not include a same video processor, which is not limited in the embodiments of the present disclosure.

In the present solution, in a case where the resolution of the sequence of video frames is less than the first resolution, the resolution of the sequence of video frames is low. In this case, the amount of data of the sequence of video frames is usually small, and the encoding complexity is low. Therefore, the sequence of video frames is allocated to the first video processor group for encoding, the number of occupied video processors may be reduced while the encoding speed is ensured, thereby reducing an occupation of system hardware resources during an encoding process.

In a case where the resolution of the sequence of video frames is greater than the first resolution and less than the second resolution, the amount of data of the sequence of video frames is usually increased compared to the case that the resolution of the sequence of video frames is less than or equal to the first resolution, and accordingly, the encoding complexity is also increased. In this case, the sequence of video frames is allocated to the second video processor group for encoding, which helps to increase the encoding speed and improve an encoding efficiency.

For example, the first resolution is approximately 4096 px×2160 px, and/or, the second resolution is approximately 7680 px×4320 px. "Approximately" may refer to, for example, the stated value (i.e., 4096 px×2160 px or 7680 px×4320 px), and may also refer to values that fluctuate up or down by about ten percent based on the stated value.

Figure 4:
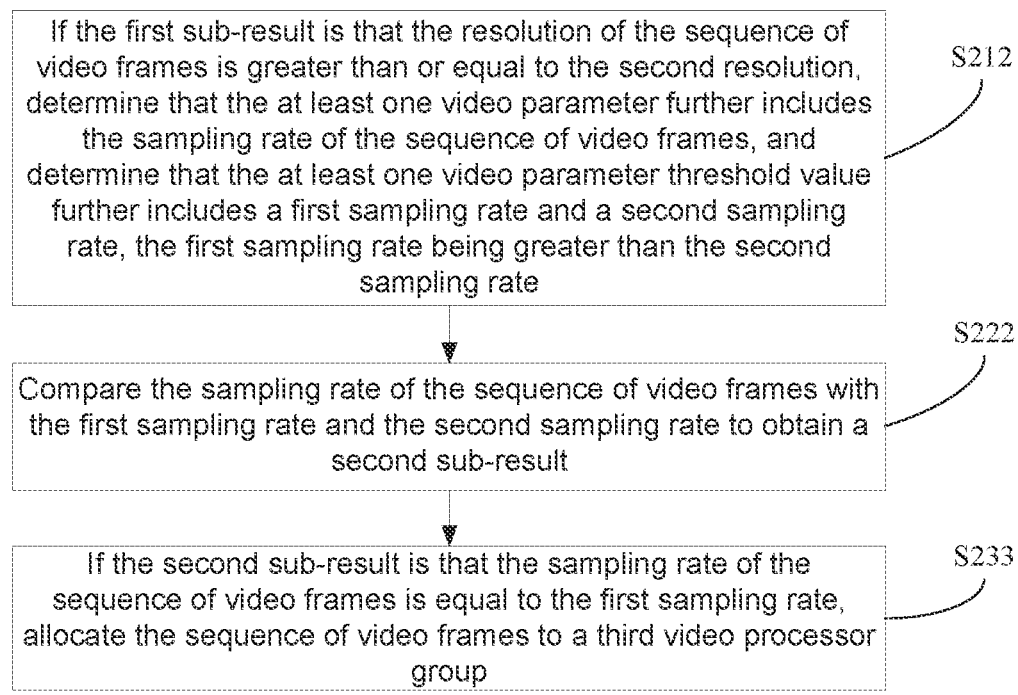
FIG. 4 is a flow diagram of yet another video processing method, in accordance with some embodiments.

In some embodiments, as shown in FIG. 4, S22 further includes S212 and S222, and S23 further includes S233.

In S212, if the first sub-result is that the resolution of the sequence of video frames is greater than or equal to the second resolution, it is determined that the at least one video parameter further includes the sampling rate of the sequence of video frames, and it is determined that the at least one video parameter threshold value further includes a first sampling rate and a second sampling rate. The first sampling rate is greater than the second sampling rate.

It can be understood that the higher the sampling rate, the better the color quality of the sequence of video frames, and moreover, the larger the amount of data of the sequence of video frames.

In S222, the sampling rate of the sequence of video frames is compared with the first sampling rate and the second sampling rate to obtain a second sub-result.

In a case where the resolution of the sequence of video frames is greater than or equal to the second resolution, the amount of data of the sequence of video frames may be accurately estimated by further judging in combination with the sampling rate of the sequence of video frames, thereby reasonably utilizing the system hardware resources.

In S333, if the second sub-result is that the sampling rate of the sequence of video frames is equal to the first sampling rate, the sequence of video frames is allocated to a third video processor group.

The number of video processors in the third video processor group is greater than the number of video processors in the second video processor group. For example, the second video processor group may include any two of all of the video processors, and the third video processor group may include any three of all of the video processors. For another example, the second video processor group may include any three of all of the video processors, and the video processor third group may include any six of all of the video processors. Therefore, the number of video processors in the third video processor group and the number of video processors in the second video processor group are not limited in the embodiments of the present disclosure, as long as the two numbers satisfy the magnitude relationship.

In addition, it will be noted that the third video processor group, the first video processor group and the second video processor group may or may not include a same video processor, which is not limited in the embodiments of the present disclosure.

In the present solution, when it is judged that the resolution of the sequence of video frames is large (i.e., the resolution of the sequence of video frames is greater than the second resolution), the sequence of video frames is not directly allocated to a large number of video processors, but the sampling rate of the sequence of video frames is further compared with the first sampling rate and the second sampling rate. For example, when it is further judged that the sampling rate of the sequence of video frames is equal to the larger first sampling rate, it is determined that the amount of data of the sequence of video frames is large, and the encoding complexity is high, and thus, it is determined that the sequence of video frames is allocated to the third video processor group, thereby reasonably utilizing the system hardware resources to increase the encoding speed.

For example, the first sampling rate may be 4:4:4, and/or, the second sampling rate may be 4:2:2.

Figures 5, 6:
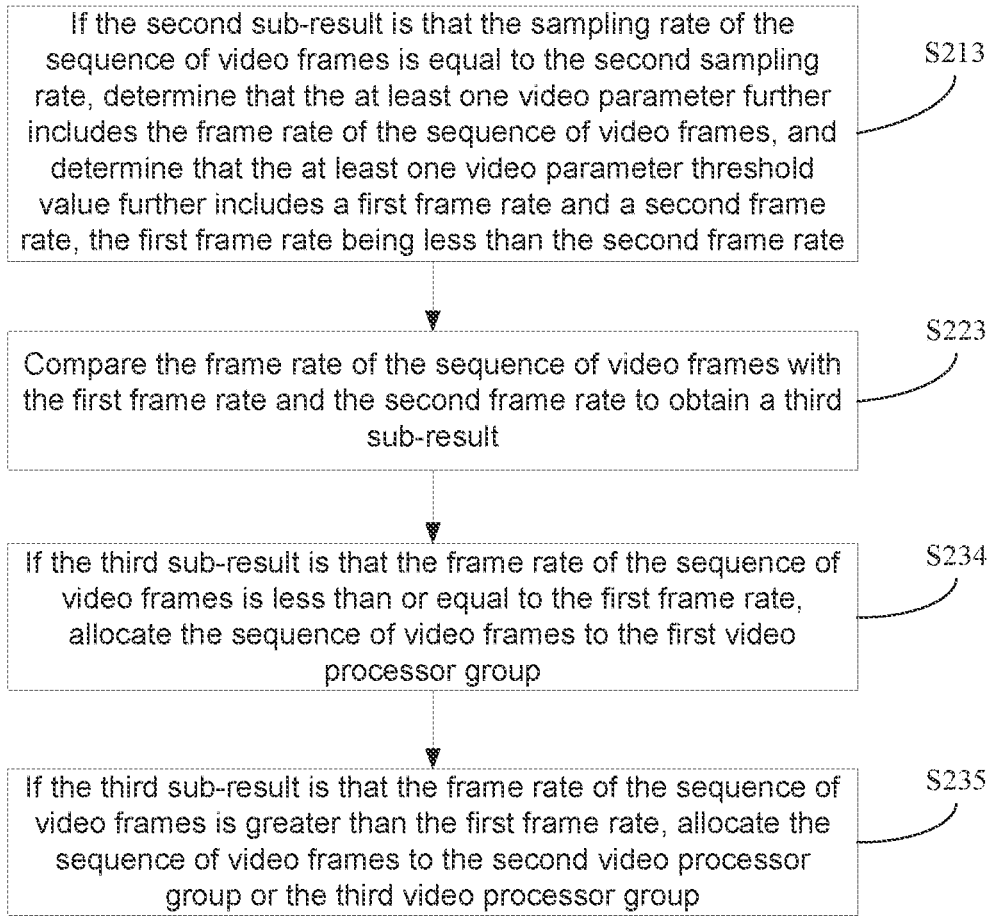
FIG. 5 is a flow diagram of yet another video processing method, in accordance with some embodiments.
FIG. 6 is a flow diagram of yet another video processing method, in accordance with some embodiments.

In some embodiments, referring to FIG. 5, S22 further includes S213 and S223, and S23 further includes S234 and S235.

In S213, if the second sub-result is that the sampling rate of the sequence of video frames is equal to the second sampling rate, it is determined that the at least one video parameter further includes the frame rate of the sequence of video frames, and it is determined that the at least one video parameter threshold value further includes a first frame rate and a second frame rate. The first frame rate is less than the second frame rate.

It can be understood that the higher the frame rate is, the clearer and more stable the display image is, and moreover, the larger the amount of data of the sequence of video frames is.

In S223, the frame rate of the sequence of video frames is compared with the first frame rate and the second frame rate to obtain a third sub-result.

In a case where the resolution of the sequence of video frames is greater than or equal to the second resolution and the sampling rate of the sequence of video frames is equal to the second sampling rate, the amount of data of the sequence of video frames may be accurately estimated by further judging in combination with the frame rate of the sequence of video frames, thereby reasonably utilizing the system hardware resources.

In S234, if the third sub-result is that the frame rate of the sequence of video frames is less than or equal to the first frame rate, the sequence of video frames is allocated to the first video processor group.

When it is judged that the resolution of the sequence of video frames is large (i.e., the resolution of the sequence of video frames is greater than the second resolution), and the sampling rate of the sequence of video frames is small (i.e., the sampling rate of the sequence of video frames is equal to the second sampling rate), the number of video processors used to encode the sequence of video frames is not directly determined, but the frame rate of the sequence of video frames is further compared with the first frame rate. For example, when it is further juged that the frame rate of the sequence of video frames is less than or equal to the smaller first frame rate, it is determined that the amount of data of the sequence of video frames is small, and the encoding complexity is low, and thus, it is determined that the sequence of video frames is allocated to the first video processor group, thereby reasonably utilizing the system hardware resources, so that the number of occupied video processors is reduced while the encoding speed is ensured.

In S235, if the third sub-result is that the frame rate of the sequence of video frames is greater than the first frame rate, the sequence of video frames is allocated to the second video processor group or the third video processor group.

When it is judged that the resolution of the sequence of video frames is large (i.e., the resolution of the sequence of video frames is greater than the second resolution), and the sampling rate of the sequence of video frames is small (i.e., the sampling rate of the sequence of video frames is equal to the second sampling rate), the number of video processors used to encode the sequence of video frames is not directly determined, but the frame rate of the sequence of video frames is further compared with the first frame rate. For example, when it is further judged that the frame rate of the sequence of video frames is greater than the first frame rate, it is determined that the amount of data of the sequence of video frames is increased compared to the case that the frame rate of the sequence of video frames is less than or equal to the first frame rate, and the encoding complexity is improved, and thus, it is determined that the sequence of video frames is allocated to the second video processor group or the third video processor group, thereby reasonably utilizing the system hardware resources and increasing the encoding speed.

For example, the first frame rate is approximately 30 fps, and/or the second frame rate is approximately 50 fps. "Approximately" may refer to, for example, the stated value (i.e., 30 fps or 50 fps), and may also refer to values that fluctuate up or down by about ten percent based on the stated value.

For example, referring to FIG. 6, in the video processing method, S23 may further include S236.

In S236, if the third sub-result is that the frame rate of the sequence of video frames is greater than or equal to the second frame rate, the sequence of video frames is allocated to the third video processor group.

When it is judged that the resolution of the sequence of video frames is large (i.e., the resolution of the sequence of video frames is greater than the second resolution), and the sampling rate of the sequence of video frames is small (i.e., the sampling rate of the sequence of video frames is equal to the second sampling rate), the number of video processors used to encode the sequence of video frames is not directly determined, but the frame rate of the sequence of video frames is further compared with the second frame rate. For example, when it is further judged that the frame rate of the sequence of video frames is greater than the second frame rate, it is determined that the amount of data of the sequence of video frames is large, and the encoding complexity is improved, and thus, it is determined that the sequence of video frames is allocated to the third video processor group, which helps to increase the encoding speed of the sequence of video frames.

Figure 7:
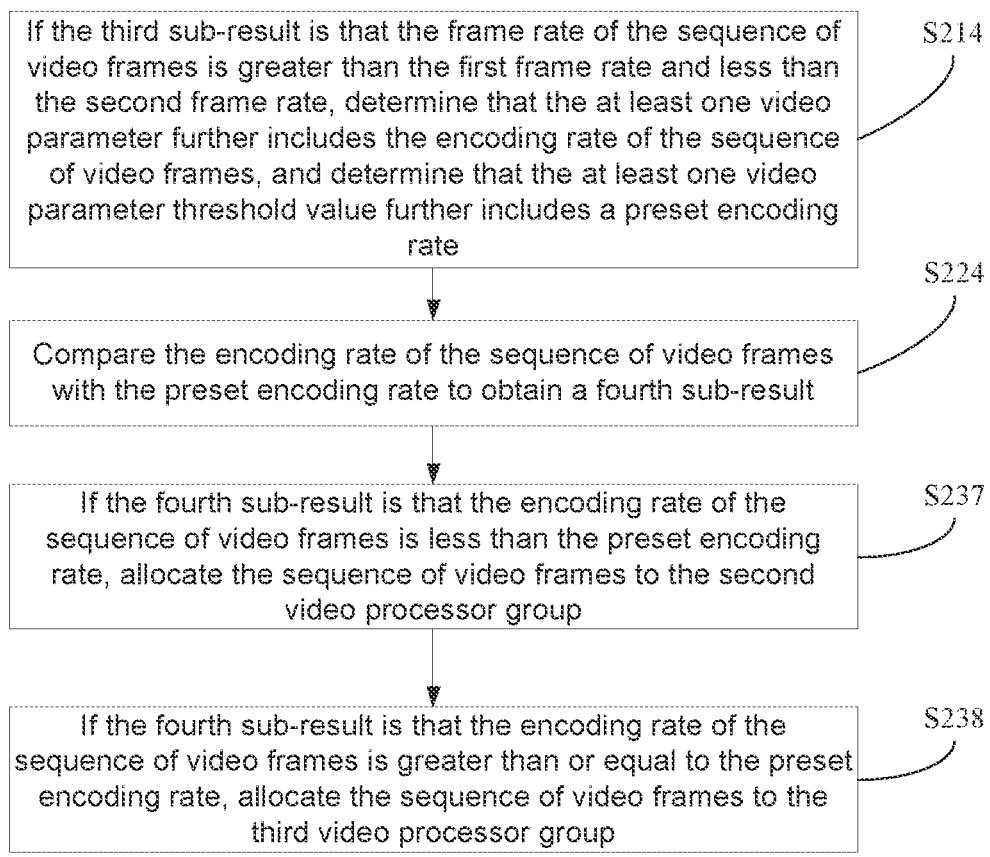
FIG. 7 is a flow diagram of yet another video processing method, in accordance with some embodiments.

In some embodiments, referring to FIG. 7, in the video processing method, S22 further includes S214 and S224, and S23 further includes S237 and S238.

In S214, if the third sub-result is that the frame rate of the sequence of video frames is greater than the first frame rate and less than the second frame rate, it is determined that the at least one video parameter further includes the encoding rate of the sequence of video frames, and it is determined that the at least one video parameter threshold value further includes a preset encoding rate.

It can be understood that the higher the encoding rate, the larger the amount of data of the sequence of video frames.

In S224, the encoding rate of the sequence of video frames is compared with the preset encoding rate to obtain a fourth sub-result.

In a case where the resolution of the sequence of video frames is greater than or equal to the second resolution, the sampling rate of the sequence of video frames is equal to the second sampling rate, and the frame rate of the sequence of video frames is greater than the first frame rate and less than or equal to the second frame rate, the amount of data of the sequence of video frames may be accurately estimated by further judging in combination with the encoding rate of the sequence of video frames, thereby reasonably utilizing the system hardware resources.

In S237, if the fourth sub-result is that the encoding rate of the sequence of video frames is less than the preset encoding rate, the sequence of video frames is allocated to the second video processor group.

When it is judged that the resolution of the sequence of video frames is large (i.e., the resolution of the sequence of video frames is greater than the second resolution), the sampling rate of the sequence of video frames is small (i.e., the sampling rate of the sequence of video frames is equal to the second sampling rate), and the frame rate of the sequence of video frames is medium (i.e., the frame rate of the sequence of video frames is greater than the first frame rate and less than or equal to the second frame rate), the number of the video processors used to encode the sequence of video frames is not directly determined, but the encoding rate of the sequence of video frames is further compared with the preset encoding rate. For example, when it is further judged that the encoding rate of the sequence of video frames is less than the preset encoding rate, it is determined that the amount of data of the sequence of video frames is medium, and the encoding complexity is medium, and thus, it is determined that the sequence of video frames is allocated to the second video processor group, which helps to reasonably utilize the system hardware resources and increase the encoding speed of the sequence of video frames.

In S238, if the fourth sub-result is that the encoding rate of the sequence of video frames is greater than or equal to the preset encoding rate, the sequence of video frames is allocated to the third video processor group.

When it is judged that the resolution of the sequence of video frames is large (i.e., the resolution of the sequence of video frames is greater than the second resolution), the sampling rate of the sequence of video frames is small (i.e., the sampling rate of the sequence of video frames is equal to the second sampling rate), and the frame rate of the sequence of video frames is medium (i.e., the frame rate of the sequence of video frames is greater than the first frame rate and less than or equal to the second frame rate), the number of the video processors used to encode the sequence of video frames is not directly determined, but the encoding rate of the sequence of video frames is further compared with the preset encoding rate. For example, when it is further judged that the encoding rate of the sequence of video frames is greater than or equal to the preset encoding rate, it is determined that the amount of data of the sequence of video frames is large, and the encoding complexity is high, and thus, it is determined that the sequence of video frames is allocated to the third video processor group, which helps to increase the encoding speed of the sequence of video frames.

For example, the preset encoding rate is approximately 100 Mbps. "Approximately" may refer to, for example, the stated value, and may also refer to values that fluctuate up or down by about ten percent based on the stated value.

Figure 8:
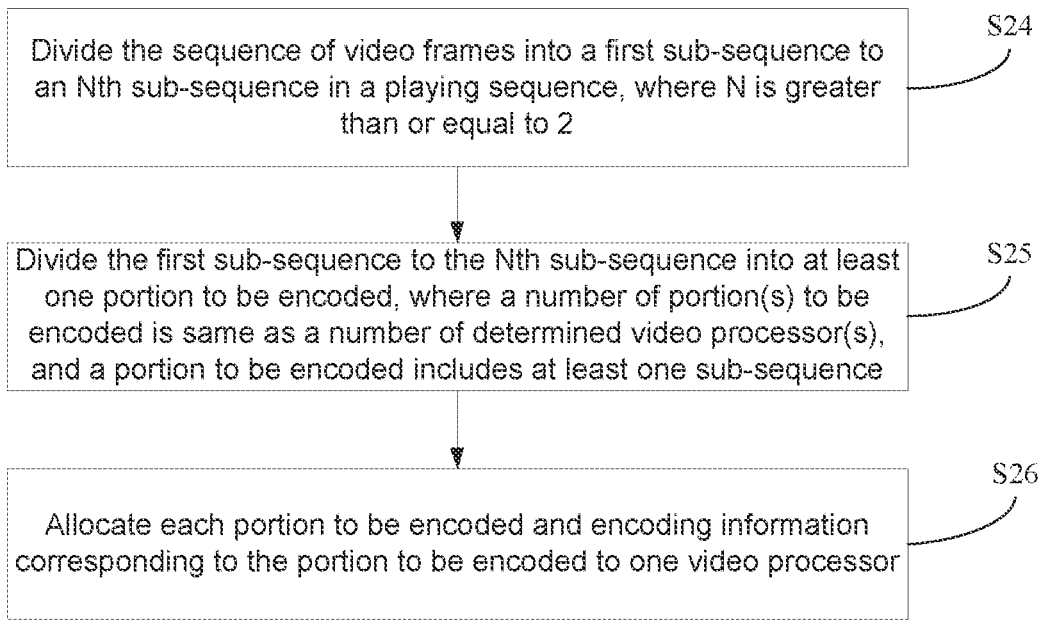
FIG. 8 is a flow diagram of yet another video processing method, in accordance with some embodiments.

In some embodiments, as shown in FIG. 8, in S2, obtaining the allocation parameter of the sequence of video frames, and allocating the sequence of video frames to the at least one video processor according to the allocation parameter, further includes S24 to S26.

In S24, the sequence of video frames is divided into a first sub-sequence to an Nth sub-sequence in a playing sequence, where N is greater than or equal to 2.

For example, it is assumed that the sequence of video frames includes 90 consecutive images, and the playing sequence is from a first image to a 90th image. In this case, the first image to the 10th image may be used as the first sub-sequence, the 11th image to the 20th image may be used as the second sub-sequence, the 21st image to the 30th image may be used as the third sub-sequence, the 31st image to the 40th image may be used as the fourth sub-sequence, the 41st image to the 50th image may be used as the fifth sub-sequence, the 51st image to the 60th image may be used as the sixth sub-sequence, the 61st image to the 70th image may be used as the seventh sub-sequence, the 71st image to the 80th image may be used as the eighth sub-sequence, and the 81st image to the 90th image may be used as the ninth sub-sequence. That is, in this case, N may be equal to 9.

In S25, the first sub-sequence to the Nth sub-sequence are divided into at least one portion to be encoded. The number of the portion(s) to be encoded is same as the number of determined video processor(s), and the portion to be encoded includes at least one sub-sequence.

For example, if it is determined that the sequence of video frames is required to be allocated to one video processor, the first sub-sequence to the Nth sub-sequence may be taken as a whole as one portion to be encoded. If it is determined that the sequence of video frames is required to be allocated to two video processors, the first sub-sequence to Nth sub-sequence may be divided into two portions to be encoded. If it is determined that the sequence of video frames is required to be allocated to three video processors, the first sub-sequence to Nth sub-sequence may be divided into three portions to be encoded.

It will be noted that any portion to be encoded may include only one sub-sequence, may also include at least two consecutive sub-sequences (e.g., the first sub-sequence and the second sub-sequence), or may further include at least two inconsecutive sub-sequences (e.g., the first sub-sequence and the third sub-sequence).

In S26, each portion to be encoded and encoding information corresponding to the portion to be encoded are allocated to one video processor. In this case, only one video processor may be used to encode the received portion to be encoded according to the received encoding information, or a plurality of video processors may be used to synchronously encode a plurality of portions to be encoded corresponding thereto in parallel.

The encoding information may be a video encoding parameter set including encoding parameters such as a key frame interval, a frame rate and a resolution.

Considering the first sub-sequence to the ninth sub-sequence as an example, a first frame of each sub-sequence may be set as a key frame, and since there are 10 images in each sub-sequence, in this case, the key frame interval is 10. Of course, this is only an example. In other embodiments of the present disclosure, the key frame interval is not necessarily set to 10. For example, the key frame interval may also be 9, 25, or 50.

For example, each video processor sequentially encodes all sub-sequences in the portion to be encoded according to the encoding information. Each video processor encodes the received portion to be encoded, and then generates at least one encoded data (e.g., a first encoded data and a third encoded data). Each encoded data corresponds to one sub-sequence in the portion to be encoded (e.g., the first encoded data corresponds to the first sub-sequence, and the third encoded data corresponds to the third sub-sequence). Then, the video processor may send the encoded data to a same numbered buffer region according to a number of a corresponding sub-sequence (e.g., the first encoded data may be sent to a first buffer region, and the third encoded data may be sent to a third buffer region). In this design, N encoded data generated after parallel encoding may be arranged in order, and disorder is not easy to occur.

There are many manners for putting the N encoded data into corresponding buffer regions. For example, considering N is equal to 9 (N=9) as an example, referring to FIG. 9, the 9 encoded data may be put into the corresponding buffer regions in the following manner.

If GOP_Num % 9 is equal to 0 (GOP_Num % 9=0), the first encoded data is put into buffer0 (i.e., the first buffer region).

If GOP_Num % 9 is equal to 1 (GOP_Num % 9=1), a second encoded data is put into buffer1 (i.e., a second buffer region).

If GOP_Num % 9 is equal to 2 (GOP_Num % 9=2), the third encoded data is put into buffer2 (i.e., the third buffer region).

If GOP_Num % 9 is equal to 3 (GOP_Num % 9=3), a fourth encoded data is put into buffer3 (i.e., a fourth buffer region).

If GOP_Num % 9 is equal to 4 (GOP_Num % 9=4), a fifth encoded data is put into buffer4 (i.e., a fifth buffer region).

If GOP_Num % 9 is equal to 5 (GOP_Num % 9=5), a sixth encoded data is put into buffer5 (i.e., a sixth buffer region).

If GOP_Num % 9 is equal to 6 (GOP_Num % 9=6), a seventh encoded data is put into buffer6 (i.e., a seventh buffer region).

If GOP_Num % 9 is equal to 7 (GOP_Num % 9=7), an eighth encoded data is put into buffer7 (i.e., an eighth buffer region).

If GOP_Num % 9 is equal to 8 (GOP_Num % 9=8), a ninth encoded data is put into buffer8 (i.e., a ninth buffer region).

The I frame in each buffer region (e.g., $I_0 \sim I_n$) is the key frame. There may be a plurality of P frames between the key frame of the first buffer region and the key frame of the second buffer region. For example, in a case where i is equal to 9 (i=9), there may be 9 P frames. In this case, an interval between two adjacent I frames is 10.

The buffer region may be a buffer region in a memory connected to the video processor. For example, the memory may include the first buffer region to the Nth buffer region.

Figure 10:
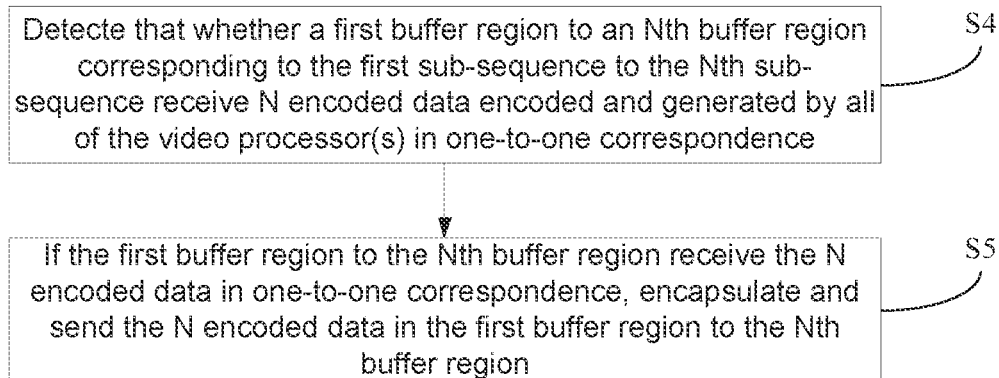
FIG. 10 is a flow diagram of yet another video processing method, in accordance with some embodiments.

On this basis, for example, as shown in FIG. 10, the video processing method further includes S4 and S5.

In S4, it is detected that whether the first buffer region to the Nth buffer region corresponding to the first sub-sequence to the Nth sub-sequence receive N encoded data encoded and generated by all of the video processor(s) in one-to-one correspondence.

In S5, if the first buffer region to the Nth buffer region receive the N encoded data in one-to-one correspondence, the N encoded data in the first buffer region to the Nth buffer region are encapsulated and sent.

The first buffer region to the Nth buffer region receive the N encoded data in one-to-one correspondence, which means that the encoding of this sequence of video frames is completed.

For example, the N encoded data may be encapsulated and sent through a real-time transport protocol (RTP) after the video encoding parameter set is added. The video encoding parameter set may be, for example, a sequence parameter set (sps) or a picture parameter set (pps).

For example, after the N encoded data are encapsulated and sent, the encoded data in the first buffer region to the Nth buffer region are cleared, so that the first buffer region to the Nth buffer region may be used to store encoded data of a next sequence of video frames.

Figure 11:
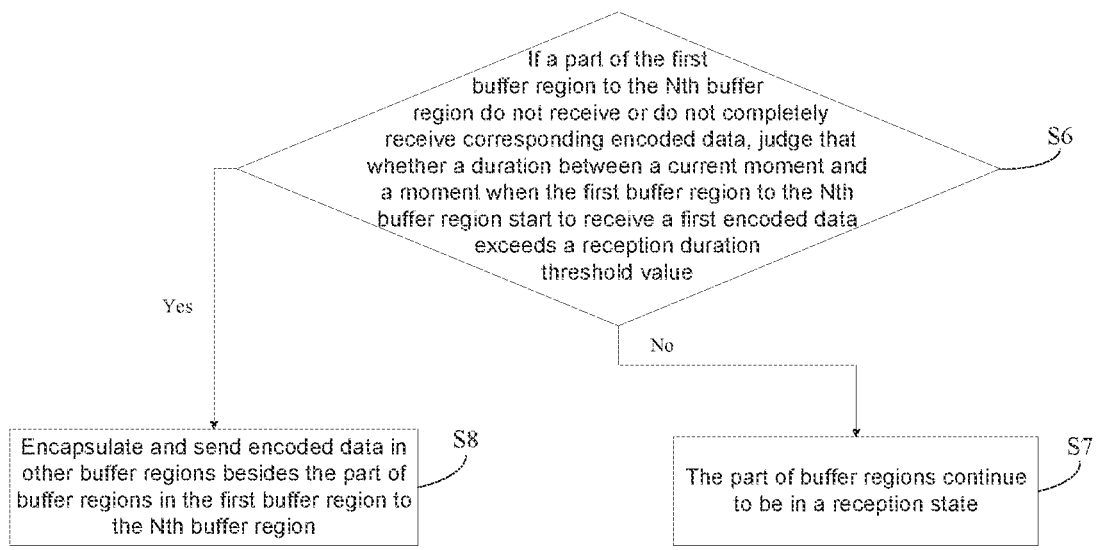
FIG. 11 is a flow diagram of yet another video processing method, in accordance with some embodiments.

In some embodiments, as shown in FIG. 11, the video processing method further includes S6 to S8.

In S6, if a part of the first buffer region to the Nth buffer region do not receive or do not completely receive corresponding encoded data, it is judged that whether a duration between a current moment and a moment when the first buffer region to the Nth buffer region start to receive the first encoded data exceeds a reception duration threshold value.

If not, S7 is executed, and the part of buffer regions continue to be in a reception state.

If yes, S8 is executed, and the encoded data in other buffer regions besides the part of buffer regions in the first buffer region to the Nth buffer region are encapsulated and sent.

The reception duration threshold value may be, for example, 300 ms. It can be understood that the reception duration threshold value may be determined according to a total amount of data of the sequence of video frames to be encoded. That is, if the total amount of data of the sequence of video frames to be encoded is increased, a corresponding reception duration threshold value is also increased. If the total amount of data of the sequence of video frames to be encoded is decreased, a corresponding reception duration threshold value is also decreased.

By setting the reception duration threshold value, it is possible to avoid a problem that the encoded data in the other buffer regions cannot be normally encapsulated and sent due to a fact that the part of buffer regions are not normally filled up because of different video processors.

For example, after the N encoded data are encapsulated and sent, the encoded data in the first buffer region to the Nth buffer region are cleared, so that the first buffer region to the Nth buffer region may be used to store encoded data of a next sequence of video frames.

Figure 12:
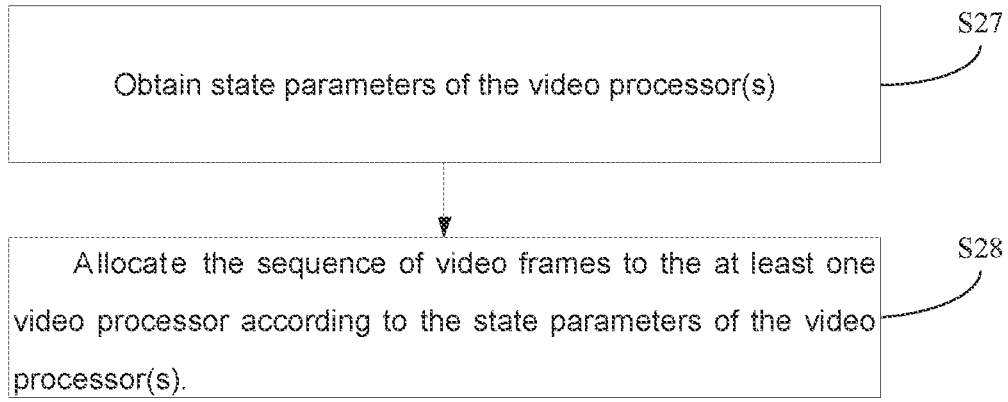
FIG. 12 is a flow diagram of yet another video processing method, in accordance with some embodiments.

In some other embodiments, as shown in FIG. 12, in S2, obtaining the allocation parameter of the sequence of video frames, and allocating the sequence of video frames to the at least one video processor according to the allocation parameter, includes S27 and S28.

In S27, state parameters of the video processor(s) are obtained.

In S28, the sequence of video frames is allocated to the at least one video processor according to the state parameters of the video processor(s).

According to the state parameters of the video processor(s), for example, it may be determined whether the video processor completes an encoding process of a previous portion to be encoded, for another example, an encoding speed of the video processor may also be determined.

Figure 13:
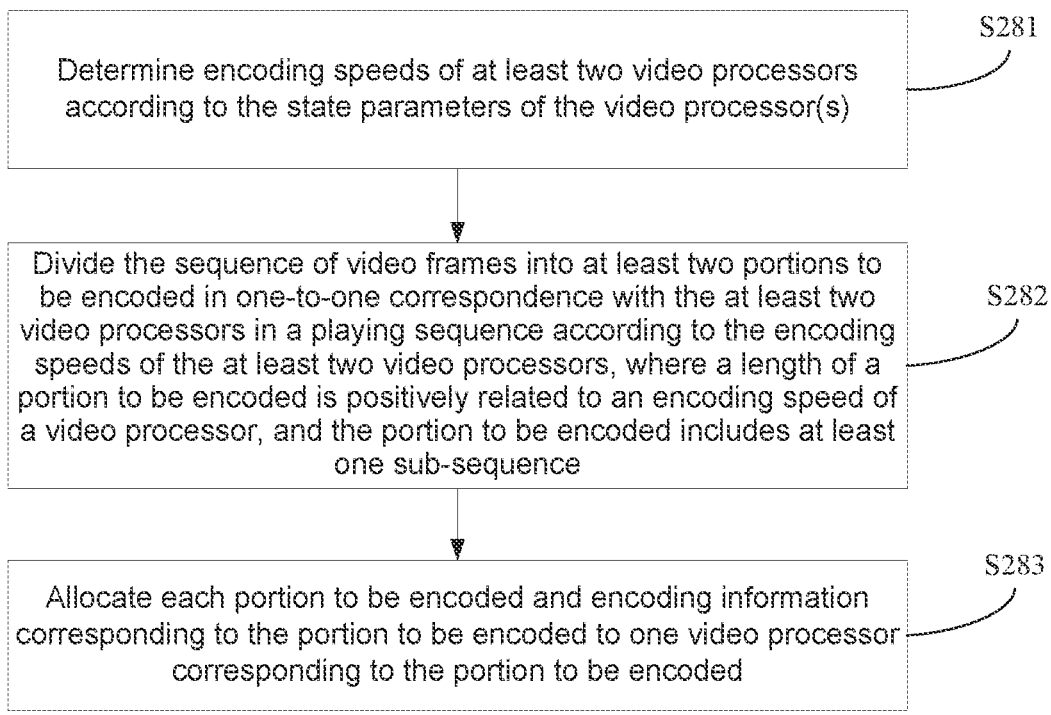
FIG. 13 is a flow diagram of yet another video processing method, in accordance with some embodiments.

For example, as shown in FIG. 13, allocating the sequence of video frames to the at least one video processor according to the state parameters of the video processor(s), may include S281 to S283.

In S281, encoding speeds of at least two video processors are determined according to the state parameters of the video processor(s).

In S282, the sequence of video frames is divided into at least two portions to be encoded in one-to-one correspondence with the at least two video processors in a playing sequence according to the encoding speeds of the at least two video processors. A length of the portion to be encoded is positively related to the encoding speed of the video processor (e.g., the two may be in direct proportion). The portion to be encoded includes at least one sub-sequence.

In S283, each portion to be encoded and encoding information corresponding to the portion to be encoded are allocated to the video processor corresponding to the portion to be encoded.

Then, each video processor may sequentially encode all sub-sequences in the portion to be encoded according to the encoding information. A specific encoding process may refer to the foregoing description, which will not be repeated here.

In this design, when two or more video processors are used for parallel processing, the sequence of video frames may be dynamically allocated. For example, the allocation is performed according to the encoding speeds. The portion to be encoded with a long length (i.e., the portion to be encoded with a large amount of data) may be allocated to the video processor with a high encoding speed, and moreover, the portion to be encoded with a short length (i.e., the portion to be encoded with a small amount of data) may be allocated to the video processor with a low encoding speed, so that loads of two or more video processors are balanced, and the processing of the sequence of video frames may be completed fast.

Lengths of the sub-sequences may be equal (i.e., the sub-sequences include same frames). In this case, by changing the number of sub-sequences in each portion to be encoded, the length of the portion to be encoded may be changed. In addition, lengths of the sub-sequences may also be unequal. In this case, by changing the lengths of the sub-sequences and/or the number of sub-sequences in each portion to be encoded, the length of each portion to be encoded may be changed.

For example, it is assumed that a sequence of YUV video frames with 60 frames is collected at a 1st second, the sequence of YUV video frames with 60 frames is directly allocated to, for example, two video processors, or the sequence of YUV video frames with 60 frames is allocated to, for example, two video processors according to the comparison result of the at least one video parameter and the at least one video parameter threshold value. In this case, the sequence of YUV video frames with 60 frames collected at the 1st second may be directly divided into two portions to be encoded with an equal length. For example, each portion to be encoded includes a sub-sequence with 30 frames. Moreover, after a sequence of YUV video frames with 60 frames collected at a 2nd second is arrived, the encoding speeds of the two video processors may be judged first. If an encoding speed of a first video processor is higher than an encoding speed of a second video processor, the sequence of video frames with 60 frames at the 2nd second may be divided into two portions to be encoded with different lengths. For example, a first portion to be encoded may include a sub-sequence with 35 frames, and a second portion to be encoded may include a sub-sequence with 25 frames. Then, after the encoding of the first video processor is completed, the first portion to be encoded is allocated to the first video processor, and after the encoding of the second video processor is completed, the second portion to be encoded is allocated to the second video processor.

It can be understood that if it is judged that the encoding speeds of the two video processors are same, the sequence of video frames with 60 frames at the 2nd second may be divided into two portions to be encoded with an equal length.

The solutions provided by some embodiments of the present disclosure are introduced mainly through method examples. Based on this, some embodiments of the present disclosure provide a video processing apparatus. In order to implement the above functions, the video processing apparatus may include corresponding hardware structures and/or software modules for executing the functions. A person skilled in the art will readily appreciate that the present disclosure is able to be implemented in a form of hardware or a combination of hardware and computer software with reference to the method steps of the examples described in the embodiments disclosed herein. Whether a certain function is executed in a form of hardware or driving hardware by computer software, depends on a particular application and design constraints of a technical solution. A professional technician may use different methods for each particular application to implement the above functions, but such implementations should not be considered as going beyond the scope of the present disclosure.

The video processing apparatus provided by the embodiments of the present disclosure may be divided into functional modules according to the above method examples. For example, the functional modules may be divided according to the functions, or two or more functions may be integrated into a processing module. The integrated module may be implemented in a form of hardware or in a form of a software functional module. It will be noted that the module division in some embodiments of the present disclosure is schematic, and is only a logical functional division, and there may be other division manners in an actual implementation.

Figure 14:
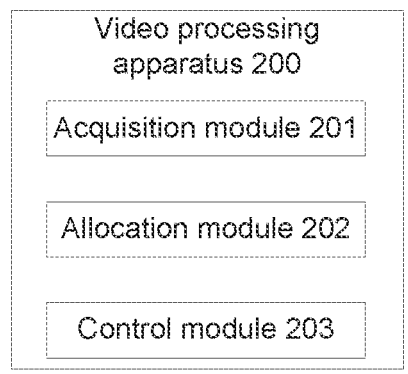
FIG. 14 is a block diagram of another video processing apparatus, in accordance with some embodiments.

In a case where the functional modules are divided according to the functions, FIG. 14 is a schematic diagram showing a possible structure of the video processing apparatus involved in some of the above embodiments. As shown in FIG. 14, the video processing apparatus 200 at least includes an acquisition module 201, an allocation module 202, and a control module 203. The acquisition module 201 may be used to support the video processing apparatus 200 to execute S1. The allocation module 202 may be used to support the video processing apparatus 200 to execute S2. The control module 203 may be used to support the video processing apparatus 200 to execute S3.

For example, the allocation module 202 may further be used to support the video processing apparatus 200 to execute S21 to S28, S211 to S214, S221 to S224, S231 to S238, and S281 to S283.

Figure 15:
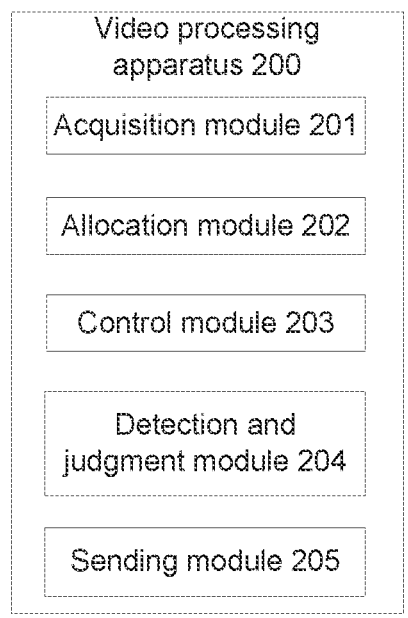
FIG. 15 is a block diagram of yet another video processing apparatus, in accordance with some embodiments.

On this basis, for example, as shown in FIG. 15, the video processing apparatus 200 may further include a detection and judgment module 204 and a sending module 205. The detection and judgment module 204 may be used to support the video processing apparatus 200 to execute S4 and S6. The sending module 205 may be used to support the video processing apparatus 200 to execute S5 and S8.

All relevant contents of the steps involved in the above method embodiments may be cited in a functional description of a corresponding functional module, which will not be repeated here.

Figure 9:
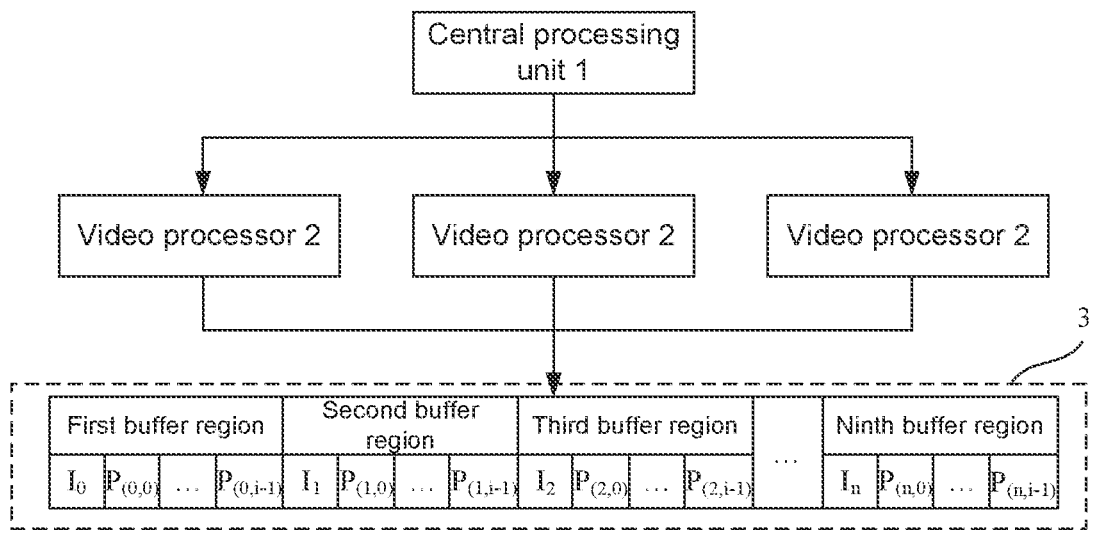
FIG. 9 is a block diagram of a video processing apparatus, in accordance with some embodiments.

In addition, FIG. 9 is a schematic diagram showing another possible structure of the video processing apparatus involved in some of the above embodiments. As shown in FIG. 9, the video processing apparatus 100 includes a central processing unit 1 and at least two video processors 2. The central processing unit 1 may be configured to execute S1 to S8, S21 to S28, S211 to S214, S221 to S224, S231 to S238, and S281 to S283.

In some examples, as shown in FIG. 9, the video processing apparatus 100 further includes a memory 3, and the memory 3 includes a first buffer region to an Nth buffer region, where N is greater than or equal to 2.

On this basis, for example, each video processor 2 may sequentially encode all sub-sequences in a received portion to be encoded according received encoding information, so as to generate at least one encoded data. Each encoded data corresponds to one sub-sequence in the portion to be encoded.

In addition, each video processor 2 may send the encoded data to a same numbered buffer region according to a number of a corresponding sub-sequence. Therefore, a plurality of encoded data generated after parallel encoding may be arranged in order, and disorder is not easy to occur.

Figure 16:
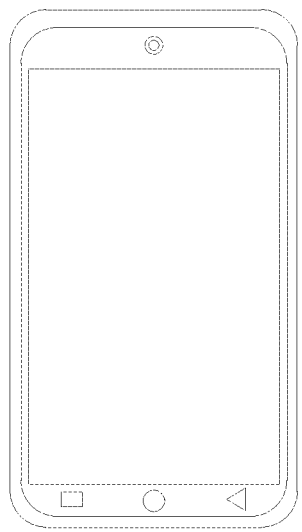
FIG. 16 is a structural diagram of an electronic device, in accordance with some embodiments.

Some embodiments of the present disclosure provide an electronic device 300. As shown in FIG. 16, the electronic device 300 includes the video processing apparatus (e.g., the video processing apparatus 100 or the video processing apparatus 200) described in any of the above embodiments.

The electronic device 300 may execute the video processing method described in some of the above embodiments through the video processing apparatus. Therefore, the electronic device 300 has same beneficial effects as the video processing method, which will not be repeated here.

The electronic device 300 may be a display equipment, for example, may be any product or component with a display function, such as a mobile phone, a tablet computer, a television, a display, a notebook computer, a digital frame or a navigator.

Some embodiments of the present disclosure provide a computer-readable storage medium (e.g., a non-transitory computer-readable storage medium). The computer-readable storage medium stores computer program instructions. When the computer program instructions run on a processor, the processor executes the video processing method in any one of the above embodiments.

For example, the computer-readable storage medium may include, but is not limited to, a magnetic storage device (e.g., a hard disk, a floppy disk or a magnetic tape), an optical disk (e.g., a compact disk (CD), a digital versatile disk (DVD)), a smart card, and a flash memory device (e.g., an erasable programmable read-only memory (EPROM), a card, a stick or a key driver). Various computer-readable storage media described in the embodiments of the present disclosure may represent one or more devices for storing information and/or other machine-readable storage media. The term "machine-readable storage media" may include, but is not limited to, various other media capable of storing, containing and/or carrying instructions and/or data.

Some embodiments of the present disclosure further provide a computer program product. The computer program product includes computer program instructions that are stored in a non-transitory computer-readable storage medium. When executed on a computer, the computer program instructions enable the computer to execute the video processing method in the above embodiments.

Some embodiments of the present disclosure further provide a computer program. When executed on a computer, the computer program enables the computer to execute the video processing method in the above embodiments.

The computer-readable storage medium, the computer program product, and the computer program have same beneficial effects as the video processing method in some of the above embodiments, which will not be repeated here.

The foregoing descriptions are merely specific implementation manners of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A video processing method, comprising:
obtaining a sequence of video frames;
obtaining an allocation parameter of the sequence of video frames, and allocating the sequence of video frames to at least one video processor according to the allocation parameter; and
processing the allocated sequence of video frames by using the at least one video processor;
wherein obtaining the allocation parameter of the sequence of video frames, and allocating the sequence of video frames to the at least one video processor according to the allocation parameter includes:
determining at least one video parameter of the sequence of video frames according to the sequence of video frames, the at least one video parameter including at least one of a resolution, a sampling rate, a frame rate, and an encoding rate;
comparing the at least one video parameter with at least one video parameter threshold value to obtain a comparison result; and
allocating the sequence of video frames to the at least one video processor according to the comparison result;
wherein comparing the at least one video parameter with the at least one video parameter threshold value to obtain the comparison result, and allocating the sequence of video frames to the at least one video processor according to the comparison result, includes:
determining that the at least one video parameter includes the resolution of the sequence of video frames, and determining that the at least one video parameter threshold value includes a first resolution and a second resolution, the first resolution being less than the second resolution;
comparing the resolution of the sequence of video frames with the first resolution and the second resolution to obtain a first sub-result;
if the first sub-result is that the resolution of the sequence of video frames is less than or equal to the first resolution, allocating the sequence of video frames to a first video processor group; and
if the first sub-result is that the resolution of the sequence of video frames is greater than the first resolution and less than the second resolution, allocating the sequence of video frames to a second video processor group;
wherein a number of video processors in the second video processor group is greater than a number of at least one video processor in the first video processor group;
wherein comparing the at least one video parameter with the at least one video parameter threshold value to obtain the comparison result, and allocating the sequence of video frames to the at least one video processor according to the comparison result, further includes:
if the first sub-result is that the resolution of the sequence of video frames is greater than or equal to the second resolution, determining that the at least one video parameter further includes the sampling rate of the sequence of video frames, and determining that the at least one video parameter threshold further includes sampling rate and a second sampling rate, the first sampling rate being greater than the second sampling rate;
comparing the sampling rate of the sequence of video frames with the first sampling rate and the second sampling rate to obtain a second sub-result; and
if the second sub-result is that the sampling rate of the sequence of video frames is equal to the first sampling rate, allocating the sequence of video frames to a third video processor group;
wherein a number of video processors in the third video processor group is greater than the number of video processors in the second video processor group.

2. The video processing method according to claim 1, wherein comparing the at least one video parameter with the at least one video parameter threshold value to obtain the comparison result, and allocating the sequence of video frames to the at least one video processor according to the comparison result, further includes:
if the second sub-result is that the sampling rate of the sequence of video frames is equal to the second sampling rate, determining that the at least one video parameter further includes the frame rate of the sequence of video frames, and determining that the at least one video parameter threshold value further includes a first frame rate and a second frame rate, the first frame rate being less than the second frame rate;
comparing the frame rate of the sequence of video frames with the first frame rate and the second frame rate to obtain a third sub-result;
if the third sub-result is that the frame rate of the sequence of video frames is less than or equal to the first frame rate, allocating the sequence of video frames to the first video processor group; and
if the third sub-result is that the frame rate of the sequence of video frames is greater than the first frame rate, allocating the sequence of video frames to the second video processor group or the third video processor group.

3. The video processing method according to claim 2, wherein comparing the at least one video parameter with the at least one video parameter threshold value to obtain the comparison result, and allocating the sequence of video frames to the at least one video processor according to the comparison result, further includes:
  if the third sub-result is that the frame rate of the sequence of video frames is greater than or equal to the second frame rate, allocating the sequence of video frames to the third video processor group.

4. The video processing method according to claim 2, wherein comparing the at least one video parameter with the at least one video parameter threshold value to obtain the comparison result, and allocating the sequence of video frames to the at least one video processor according to the comparison result, further includes:
  if the third sub-result is that the frame rate of the sequence of video frames is greater than the first frame rate and less than the second frame rate, determining that the at least one video parameter further includes the encoding rate of the sequence of video frames, and determining that the at least one video parameter threshold value further includes a preset encoding rate;
  comparing the encoding rate of the sequence of video frames with the preset encoding rate to obtain a fourth sub-result;
  if the fourth sub-result is that the encoding rate of the sequence of video frames is less than the preset encoding rate, allocating the sequence of video frames to the second video processor group; and
  if the fourth sub-result is that the encoding rate of the sequence of video frames is greater than or equal to the preset encoding rate, allocating the sequence of video frames to the third video processor group.

5. The video processing method according to claim 1, wherein obtaining the allocation parameter of the sequence of video frames, and allocating the sequence of video frames to the at least one video processor according to the allocation parameter, further includes:
  dividing the sequence of video frames into a first sub-sequence to an Nth sub-sequence in a playing sequence, wherein N is greater than or equal to 2;
  dividing the first sub-sequence to the Nth sub-sequence into at least one portion to be encoded, wherein a number of the at least one portion to be encoded is same as a number of determined at least one video processor, and a portion to be encoded includes at least one sub-sequence; and
  allocating each portion to be encoded and encoding information corresponding to the portion to be encoded to one video processor.

6. The video processing method according to claim 5, further comprising:
  detecting that whether a first buffer region to an Nth buffer region corresponding to the first sub-sequence to the Nth sub-sequence receive N encoded data encoded and generated by all of the at least one video processor in one-to-one correspondence; and
  if the first buffer region to the Nth buffer region receive the N encoded data in one-to-one correspondence, encapsulating and sending the N encoded data in the first buffer region to the Nth buffer region.

7. The video processing method according to claim 6, further comprising:
  if a part of the first buffer region to the Nth buffer region do not receive or do not completely receive corresponding encoded data, judging that whether a duration between a current moment and a moment when the first buffer region to the Nth buffer region start to receive a first encoded data exceeds a reception duration threshold value;
  if the duration does not exceed the reception duration threshold value, the part of buffer regions continuing to be in a reception state; and
  if the duration exceeds the reception duration threshold value, encapsulating and sending encoded data in other buffer regions besides the part of buffer regions in the first buffer region to the Nth buffer region.

8. The video processing method according to claim 1, wherein obtaining the allocation parameter of the sequence of video frames, and allocating the sequence of video frames to the at least one video processor according to the allocation parameter, includes:
  obtaining state parameters of the at least one video processor; and
  allocating the sequence of video frames to the at least one video processor according to the state parameters of the at least one video processor.

9. The video processing method according to claim 8, wherein allocating the sequence of video frames to the at least one video processor according to the state parameters of the at least one video processor, includes:
  determining encoding speeds of at least two video processors according to the state parameters of the at least one video processor;
  dividing the sequence of video frames into at least two portions to be encoded in one-to-one correspondence with the at least two video processors in a playing sequence according to the encoding speeds of the at least two video processors, wherein a length of a portion to be encoded is positively related to an encoding speed of a video processor, and the portion to be encoded includes at least one sub-sequence; and
  allocating each portion to be encoded and encoding information corresponding to the portion to be encoded to one video processor corresponding to the portion to be encoded.

10. The video processing method according to claim 5, wherein processing the allocated sequence of video frames by using the at least one video processor, includes:
  encoding, by each video processor, all sub-sequences in the portion to he encoded sequentially according to the encoding information.

11. A video processing apparatus, comprising a central processing unit and at least two video processors, the central processing unit being configured to execute following operations:
  obtaining a sequence of video frames;
  obtaining an allocation parameter of the sequence of video frames, and allocating the sequence of video frames to at least one video processor according to the allocation parameter; and
  processing the allocated sequence of video frames by using the at least one video processor,
  wherein obtaining the allocation parameter of the sequence of video frames, and allocating the sequence of video frames to the at least one video processor according to the allocation parameter, includes:
    determining at least one video parameter of the sequence of video frames according to the sequence of video frames, the at least one video parameter including at least one of a resolution, a sampling rate, a frame rate, and an encoding rate;

comparing the at least one video parameter with at least one video parameter threshold value to obtain a comparison result; and allocating the sequence of video frames to the at least one video processor according to the comparison result;

wherein comparing the at least one video parameter with the at least one video parameter threshold value to obtain the comparison result, and allocating the sequence of video frames to the at least one video processor according to the comparison result, includes:

determining that the at least one video parameter includes the resolution of the sequence of video frames, and determining that the at least one video parameter threshold value includes a first resolution and a second resolution, the first resolution being less than the second resolution;

comparing the resolution of the sequence of video frames with the first resolution and the second resolution to obtain a first sub-result;

if the first sub-result is that the resolution of the sequence of video frames is less than or equal to the first resolution, allocating the sequence of video frames to a first video processor group; and if the first sub-result is that the resolution of the sequence of video frames is greater than the first resolution and less than the second resolution, allocating the sequence of video frames to a second video processor group;

wherein a number of video processors in the second video processor group is greater than a number of at least one video processor in the first video processor group;

wherein comparing the at least one video parameter with the at least one video parameter threshold value to obtain the comparison result, and allocating the sequence of video frames to the at least one video processor according to the comparison result, further includes;

if the first sub-result is that the resolution of the sequence of video frames is greater than or equal to the second resolution, determining that the at least one video parameter further includes the sampling rate of the sequence of video frames, and determining that the at least one video parameter threshold value further includes a first sampling rate and a second sampling rate, the first sampling rate being greater than the second sampling rate;

comparing the sampling rate of the sequence of video frames with the first sampling rate and the second sampling rate to obtain a second sub-result; and if the second sub-result is that the sampling rate of the sequence of video frames is equal to the first sampling rate, allocating the sequence of video frames to a third video processor group;

wherein a number of video processors in the third video processor group is greater than the number of video processors in the second video processor group.

12. The video processing apparatus according to claim 11, wherein the central processing unit is configured to:

divide the sequence of video frames into a first sub-sequence to an Nth sub-sequence in a playing sequence, wherein N is greater than or equal to 2;

divide the first sub-sequence to the Nth sub-sequence into at least one portion to be encoded, wherein a number of the at least one portion to be encoded is same as a number of determined at least one video processor, and a portion to be encoded includes at least one sub-sequence; and allocate each portion to be encoded and encoding information corresponding to the portion to be encoded to one video processor.

13. The video processing apparatus according to claim 12, further comprising a memory synchronously connected to all of the at least one video processor, the memory including a first buffer region to an Nth buffer region, wherein N is greater than or equal to 2;

each video processor is configured to: sequentially encode all sub-sequences in the portion to be encoded according to the encoding information, so as to generate at least one encoded data, wherein each encoded data corresponds to one sub-sequence in the portion to be encoded; and send the encoded data to a same numbered buffer region according to a number of a corresponding sub-sequence.

14. An electronic device, comprising the video processing apparatus according to claim 11.

15. The electronic device according to claim 14, wherein the electronic device is a display device.

16. A non-transitory computer-readable storage medium storing computer program instructions, wherein when the computer program instructions run on a processor, the processor executes the video processing method according to claim 1.

* * * * *